(12) United States Patent
Fujii et al.

(10) Patent No.: US 6,923,049 B2
(45) Date of Patent: Aug. 2, 2005

(54) METHOD OF TESTING FRICTION COMPONENTS FOR AUTOMATIC TRANSMISSIONS

(75) Inventors: Yuji Fujii, Ann Arbor, MI (US); Ted Duane Snyder, Brighton, MI (US); Gregory Michael Pietron, Canton, MI (US); William Emil Tobler, Willis, MI (US)

(73) Assignee: Link Engineering Company, Plymouth, MI (US)

( * ) Notice: Subject to any disclaimer, the term of this patent is extended or adjusted under 35 U.S.C. 154(b) by 16 days.

(21) Appl. No.: 10/737,319

(22) Filed: Dec. 16, 2003

(65) Prior Publication Data

US 2005/0126272 A1 Jun. 16, 2005

(51) Int. Cl.[7] ............................................. G01M 13/02
(52) U.S. Cl. .................................................. 73/118.1
(58) Field of Search ..................... 73/112, 116, 117.2, 73/117.3, 118.1, 119 R; 701/29

(56) References Cited

U.S. PATENT DOCUMENTS

| | | | | | |
|---|---|---|---|---|---|
| 4,592,228 | A | * | 6/1986 | Lucia ......................... | 73/118.1 |
| 5,537,865 | A | * | 7/1996 | Shultz ......................... | 73/118.1 |
| 5,847,272 | A | * | 12/1998 | Schneider et al. .......... | 73/118.1 |
| 6,155,948 | A | * | 12/2000 | Gierer ......................... | 475/123 |
| 6,343,504 | B1 | * | 2/2002 | Shultz ......................... | 73/118.1 |
| 6,754,603 | B2 | * | 6/2004 | Turbett et al. ............... | 702/113 |
| 6,779,414 | B2 | * | 8/2004 | Shori et al. ................. | 73/865.9 |
| 2002/0023483 | A1 | * | 2/2002 | Reinisch et al. ............ | 73/116 |
| 2002/0189320 | A1 | * | 12/2002 | Otaki et al. ................. | 73/9 |
| 2003/0167143 | A1 | * | 9/2003 | Turbett et al. ............... | 702/113 |

OTHER PUBLICATIONS

SAE No. 2 Clutch Friction Test Machine Guideline—SAE J286 Sep96, pp. 29-152-153.
SAE Band Friction Test Machine Guidelines—SAE J1499 Feb97, pp. 29-153-154.
SAE No. 2 Friction Test Machine 3600 R/MIN Stepped Power Test—SAE J2487 Apr00, pp. 29-150-151 and 29-169.
"Development and Testing of Friction Clutches", Robert J. Fanella, Design Practices: Passenger Car Automatic Transmissions, 3rd Ed., AE-18, 1994, Society of Automotive Engineers, Inc., pp. 399-409.
"Review of West Friction Component Models for Automatic Transmission Shift Analysis", Yuji Fujii, et al., No. 2003-01-1665, SAE International, Noise & Vibration Conference and Exhibition, Traverse City, MI, May 5-8, 2003.

* cited by examiner

Primary Examiner—Eric S. McCall
(74) Attorney, Agent, or Firm—Brooks Kushman P.C.

(57) ABSTRACT

A method of testing a friction component for a transmission that has first and second parts. The first part of the friction component is attached to a drive shaft and the second part is attached to a grounding element. The first part of the friction component is rotated until the drive shaft and the first part of the friction component rotate at a target sliding speed $V_{target}$. An actuation force is applied to the friction component at a time $t_0$. Operation of the motor drive is continued to maintain the speed of rotation of the drive shaft at $V_{target}$ until a predetermined level of engagement torque $T_{th}$ is obtained. The motor torque is then reduced to a predetermined level $T_m$. The sliding speed of the drive shaft is then decreased and the test is terminated when the sliding speed falls to zero.

14 Claims, 6 Drawing Sheets

METHOD OF TESTING FRICTION COMPONENTS FOR AUTOMATIC TRANSMISSIONS

BACKGROUND OF THE INVENTION

1. Field of the Invention

The present invention relates to a test procedure for testing friction components of an automatic transmission.

2. Background Art

Automatic transmissions use wet friction components for automatically shifting planetary gear sets. Examples of wet friction components used in automatic transmissions include band brakes and clutch packs. In the design of automatic transmission systems, friction components must be tested to assure adequate transmission performance. If friction components are not properly designed or matched to an automatic transmission, shifting may be rough, jerky, or inefficient. In addition, the reliability and durability of friction components may be reduced.

Referring to FIG. 1, a standard inertia-absorption-type test stand such as an industry-standard Society of Automotive Engineers #2 (SAE#2) test stand is shown. SAE#2 test stands have been widely used to evaluate friction component engagement behavior. However, engagement conditions on SAE#2 test stands are inconsistent with the shifting kinematics of many automatic transmission systems. For example, in a typical up-shift that involves two friction components, sliding speed of the on-coming friction component slightly increases or remains nearly constant during an initial phase of the engagement (i.e., the torque phase of the shifting) even after it develops engagement torque. The slip speed starts decreasing toward zero only after the off-going friction component disengages at the beginning of the inertia phase. However, in a conventional inertia-absorption test, the slip speed starts decreasing as soon as the engagement torque starts rising. Due to this inconsistent slip speed profile, conventional test methods used on friction component test stands fail to accurately capture realistic engagement effects such as hydrodynamic effects on engagement torque.

During shifting, friction component engagement torque primarily determines the level of automatic transmission output shaft torque. The engagement characteristics of friction components have a direct impact on shift quality. Engagement behavior varies widely under different operating conditions. Oil and friction material characteristics may also have a significant impact on the engagement process. During automatic transmission system development, it is important to accurately characterize friction component engagement behavior under all operating conditions.

Referring again to FIG. 1, the SAE#2 inertia-absorption-type test stand is illustrated. A friction component 10 to be tested (i.e., either a band brake system as illustrated in FIG. 1 or a plate clutch assembly) is mounted on a drive shaft 12 that is connected to at least one inertia wheel 14 and a driving motor 16. One part of the friction component 10a is connected to the motor 16 while the other part of the friction component 10b is grounded to a housing 18. The frictional interface is lubricated with oil to simulate operation in a wet friction component environment.

Referring to FIG. 2, a flow diagram illustrating a control procedure for a SAE#2 friction component engagement test stand is provided that shows how the test stand is used in a typical prior art test protocol. The test control system initializes control variables at a block 20 wherein the system is initialized at t=0 with V(0)=0 and F(0)=0. A motor speed or drive shaft speed V(t) and an engagement force F(t) are measured at a block 22. Other variables may also be measured during the test, including a friction component engagement torque T(t). The driving motor 16 first raises the drive shaft speed V(t) to a prescribed value $V_{target}$ as shown in a block 24 through either an open-loop control or a closed-loop control using measurements of V(t) as a feedback signal. When V(t) reaches its target value of $V_{target}$, as shown in a block 28, the drive motor 16 is decoupled from the drive shaft 12 and the friction component 10 at a block 30. At a block 32, the test control system controls the engagement force F(t) to follow a prescribed force profile $F_{target}(t)$ through either an open-loop control or a closed-loop control using measurements of F(t) as a feedback signal. As soon as the friction component 10 engagement torque develops, the drive shaft 12 slows down in response to engagement torque and the system's mechanical inertia. When the drive shaft speed V(t) reaches zero at a block 34, the test cycle is complete. This system fails to create a test condition that corresponds to the torque phase of actual automatic transmission shifting.

Referring now to FIG. 3, test data measured on the test stand of FIG. 1 is illustrated in accordance with the prior art test procedure. The motor 16 rotates one part of the friction component 10a to achieve a target sliding speed $V_{target}$ prior to the test, as shown by reference numeral 36. When engagement is commanded at a time $t_0$, an actuator 19 applies an engagement force pneumatically or hydraulically to the friction component 10. The engagement force profile is shown by reference numeral 37. The sliding speed remains at about a value $V_{target}$ while the actuator 19 strokes against its return mechanism. At or near the end of stroking at a time $t_0+t_s$, the motor 16 is powered off or de-coupled from the drive shaft 12. As soon as the engagement torque rises at $t_0+t_s$, the sliding speed starts decreasing. Engagement torque is shown by reference numeral 38. As engagement proceeds, the sliding speed decreases, approaching zero.

The prior art test methodology is limited to evaluating engagement behavior of automatic transmission shift events whose kinematics allow the sliding speed to drop as soon as engagement torque rises. In many automatic transmission shift events, the sliding speed actually increases or remains nearly constant during the torque phase even after friction component engagement torque develops. Unrealistic or erroneous engagement test results for a friction component may adversely impact application of the test results in automatic transmission design.

For the foregoing reasons, the present invention is directed to providing a method for testing friction component engagement behavior on friction component test stands to obtain results that are consistent with automatic transmission shift kinematics.

SUMMARY OF THE INVENTION

According to one aspect of the present invention, a method of testing a friction component for an automatic transmission is provided that more accurately simulates friction component performance. The method comprises installing a friction component in a test stand having a drive shaft and a grounding anchor with a first part of the friction component attached to the drive shaft and a second part of the friction component attached to the grounding anchor. The drive shaft of the test stand is rotated with a motor drive until the drive shaft including the first part of the friction component rotates at a target sliding speed $V_{target}$ and continues rotation at that speed. An actuation force is applied to an actuator of the friction component at a start time $t_0$ to stroke the actuator over a stroke time $t_s$ and to apply an engagement force to the friction component at $t_0+t_s$. Operation of the motor drive is continued to maintain the speed of rotation of the drive shaft at $V_{target}$ for a period of time corresponding to the target torque phase time $t_t$. The motor drive is decoupled from the drive shaft at $t_0+t_s+t_t$ which allows the rotating speed of the drive shaft and the sliding speed of the friction component to decrease in response to engagement torque of the friction component. The task is terminated when the sliding speed falls to zero during a time period referred to as the inertia phase $t_i$.

Other aspects of the method further comprise the actuator having a return mechanism that applies a biasing force to return the friction component to a disengaged condition. In the absence of any significant biasing force, the value for the actuator stroke time $t_s$ may be set to approximately zero. The torque phase interval $t_t$ begins at $t_0+t_s$ and may terminate when a feedback signal representative of a predetermined engagement torque $T_{th}$ is obtained. Measurements of the drive shaft rotational speed may be used to control the drive shaft rotating speed at $V_{target}$ through a feedback control until the time $t=t_0+t_s+t_t$. Alternatively, drive shaft speed measurements V(t) may be used to control the drive shaft rotating speed V(t) through a feedback control until T(t) reaches $T_{th}$. Measurements in the engagement torque T(t) may be used as a feedback signal to monitor when T(t) is greater than zero to determine $t_0+t_s$. Measurements of T(t) are used as feedback signals to monitor whether the engagement torque level has reached $T_{th}$.

In an alternative embodiment of the invention, a method of testing a friction component for an automatic transmission is provided that is based on reducing the motor torque to a predetermined level. The method begins by installing a friction component that has a first part and a second part in a test stand having a drive shaft and a grounding element. The first part of the friction component is attached to the drive shaft and the second part of the friction component is attached to the grounding element. The first part of the friction component is rotated with a motor drive until the drive shaft and the first part of the friction component rotate at a target sliding speed $V_{target}$ and continuing rotation at $V_{target}$. An actuation force is applied to an actuator of the friction component at time $t_0$. Operation of the motor drive is continued to maintain the speed of rotation of the drive shaft at $V_{target}$ for a period of time until the predetermined level of torque $T_{th}$ is obtained. Upon obtaining $T_{th}$, the motor torque is reduced to a predetermined level $T_m$. Upon reduction to $T_m$, the sliding speed of the drive shaft decreases until the sliding speed falls to zero during a time period referred to as the inertia phase $t_i$.

According to other aspects of this latter method, the level of $T_m$ can be adjusted to lengthen or shorten $t_i$ without modifying or adjusting one or more mechanical inertia wheels that may be attached to the drive shaft.

According to another aspect of the present invention, a system is provided for testing a friction component of an automatic transmission. The system includes a test stand in which a friction component is installed with a first part of the friction component being attached to a drive shaft and a second part of the friction component being attached to a grounding portion of the test stand. A motor drive rotates the drive shaft of the test stand until the first part of the friction component and drive shaft rotate at a target sliding speed $V_{target}$ and continuing rotation at $V_{target}$. An actuator of the friction component is actuated at time $t_0$. The actuator has a return mechanism that applies a biasing force to return the friction component to a disengaged condition. The actuator is stroked against the return mechanism during a time $t_s$ to cause the friction component to apply an engagement force at time $t_0+t_s$. Operation of the motor drive is continued to maintain the speed of the rotation of the drive shaft at $V_{target}$ for a period of time corresponding to the target torque phase time $t_t$. The motor drive is decoupled from the drive shaft at the end of $t_t$ and the rotating speed of the drive shaft and first part of the friction component are allowed to decrease in response to engagement torque of the friction component. The test is terminated when the sliding speed falls to zero during a time period referred to as the inertia phase $t_i$.

According to other aspects of the invention as it relates to a system for testing friction components, the time for decoupling the motor drive is $t_0+t_s+t_t$. The target for the torque phase interval $t_t$ begins at $t_0+t_s$ and terminates when a feedback signal representative of a predetermined level of engagement torque $T_{th}$ is obtained.

Measurements of engagement torque T(t) may be used as a feedback signal to monitor whether the engagement torque level has reached the predetermined threshold level $T_{th}$.

These and other aspects of the present invention will be better understood in view of the attached drawings and following detailed description of several illustrative embodiments of the present invention.

DETAILED DESCRIPTION OF THE PREFERRED EMBODIMENT(S)

Figure 4:
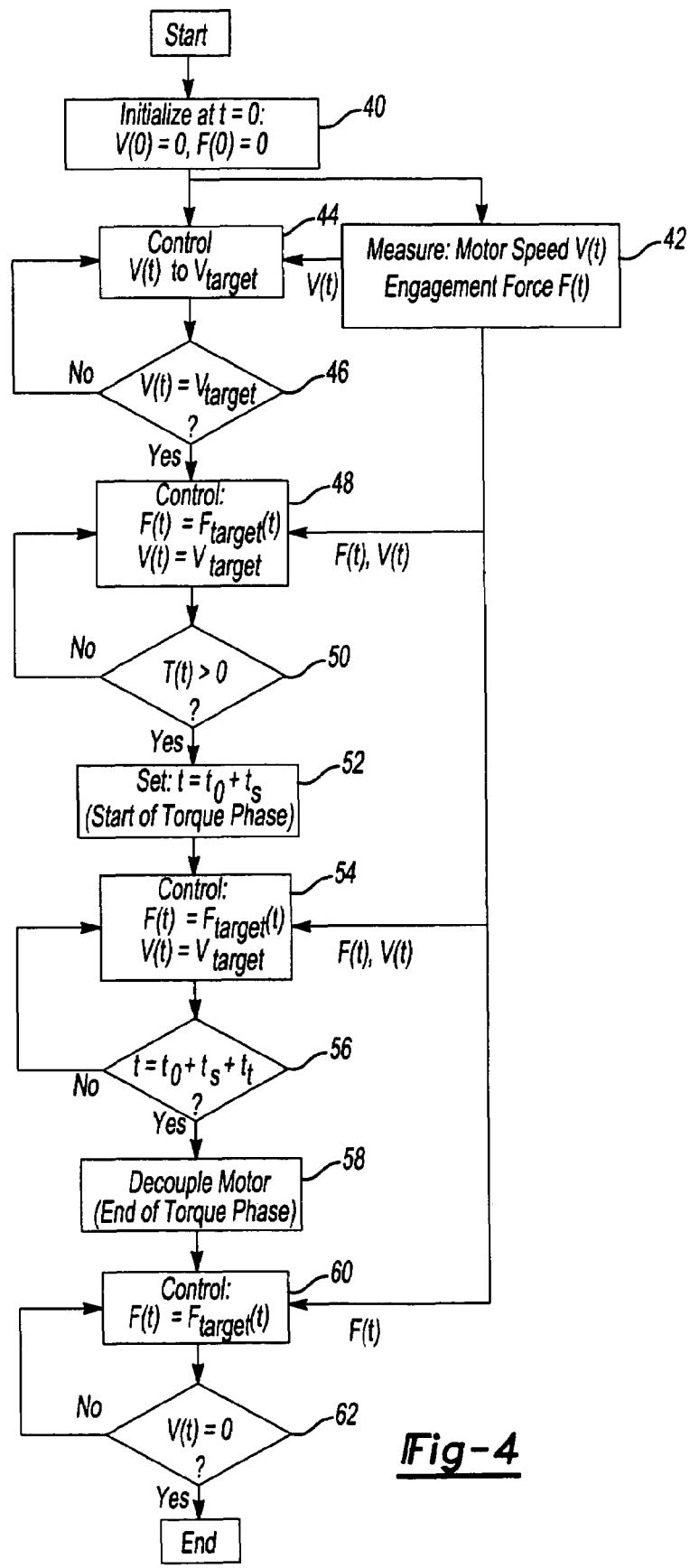
FIG. 4 is a flow diagram illustrating a control procedure wherein the motor is decoupled when $t=t_0+t_s+t_t$.

Referring now to FIG. 4, a flow diagram illustrates implementation of an improved control procedure for an SAE#2 friction component test stand according to one embodiment of the present invention. At a block 40, the test control system initializes control variables V(t) and F(t) at t=0, such that V(0)=0, and F(0)=0. Drive shaft speed V(t) and engagement force F(t) are measured at a block 42. Other variables also measured during the test include friction component engagement torque T(t). To prepare for friction component engagement, the drive motor 16 raises the drive shaft 12 speed to a prescribed value $V_{target}$ at a block 44 and a decision block 46. Once V(t) reaches its target value of $V_{target}$ as shown in the decision block 46, the test control system begins controlling engagement force F(t) as shown in an action block 48. Values of F(t) are equated to $F_{target}(t)$ using either an open-loop control or a closed-loop control with measurements of F(t) as a feedback signal. The test control system controls motoring torque to maintain the target drive shaft speed V(t) of $V_{target}$ through either an open-loop or a closed-loop control using measurements of V(t) as a feedback signal that is provided to the block 48. When the measured engagement torque T(t) becomes greater than zero, as shown in a decision block 50, a timer is set to $t=t_0+t_s$ at a block 52 to record the start of the torque phase. As the engagement force F(t) increases, the friction component engagement torque T(t) exerted on the drive shaft 12 as brake torque also increases. The test control system controls motoring torque to maintain the drive shaft speed V(t) at its target $V_{target}$ through a closed-loop control using measurements of V(t) as a feedback signal, as shown in an action block 54. This creates an engagement condition that corresponds to a torque phase of an automatic transmission shifting in which a friction component sliding speed stays relatively constant. When the torque phase interval reaches the end at a value $t_r$ or when the timer reaches $t=t_0+t_s+t_r$, as shown in a decision block 56, the motor 16 is de-powered or decoupled from the drive shaft 12 and the friction component 10 to end the torque phase as shown in a block 58. As the engagement continues, the drive shaft slows down according to engagement torque and the mechanical inertia of the system. The control system continues to control engagement force F(t) at a block 60 using measurements of F(t) as feedback. When the drive shaft speed (e.g., friction component slip speed) V(t) reaches zero as detected at a decision block 62, the test cycle completes and the motor system is decoupled from the drive shaft 16 and the friction component.

Figure 1:
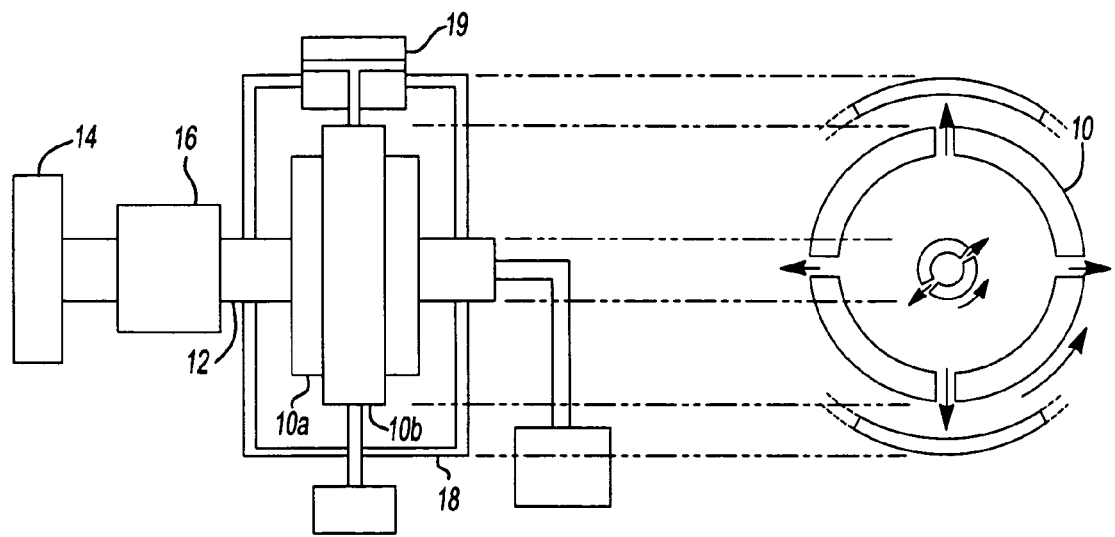
FIG. 1 is a schematic representation of an inertia-absorption-type friction component engagement test stand (shown with a band brake)
Figure 2:
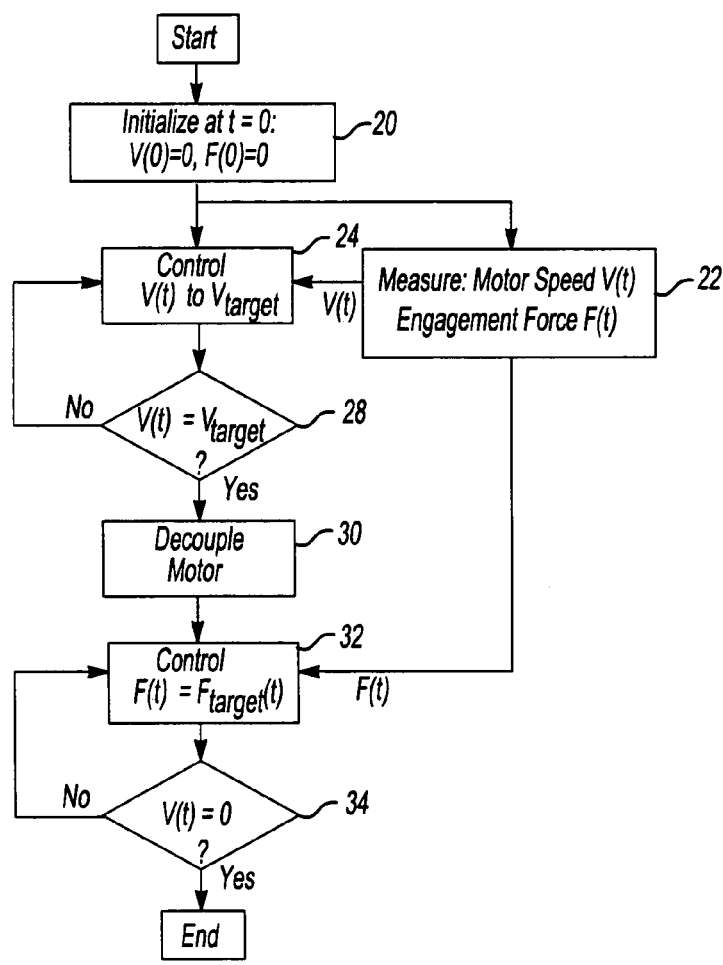
FIG. 2 is a flow diagram of a prior art test procedure.
Figure 3:
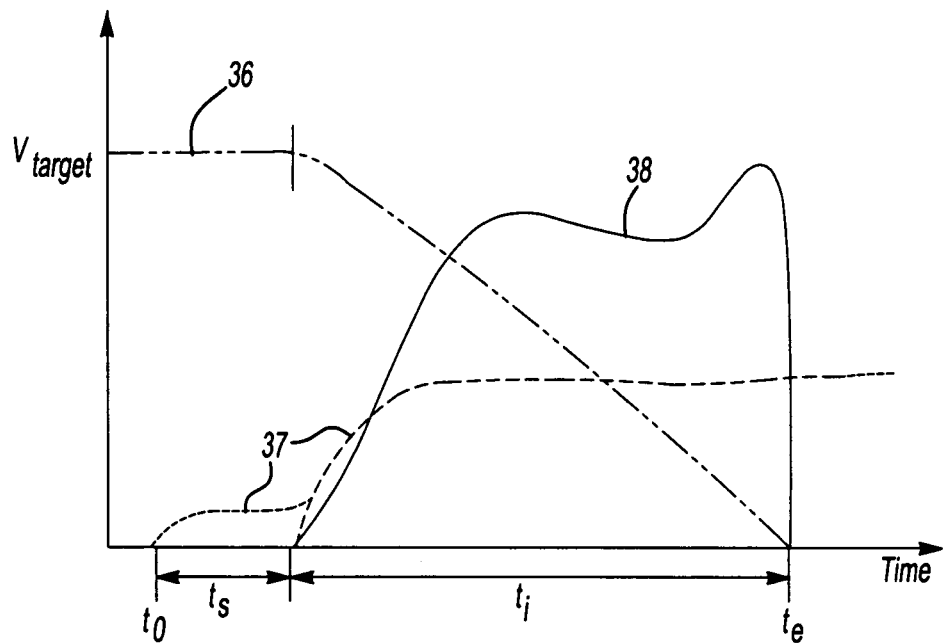
FIG. 3 is a graph illustrating an example of test data measured according to the methodology of the prior art.
Figure 5:
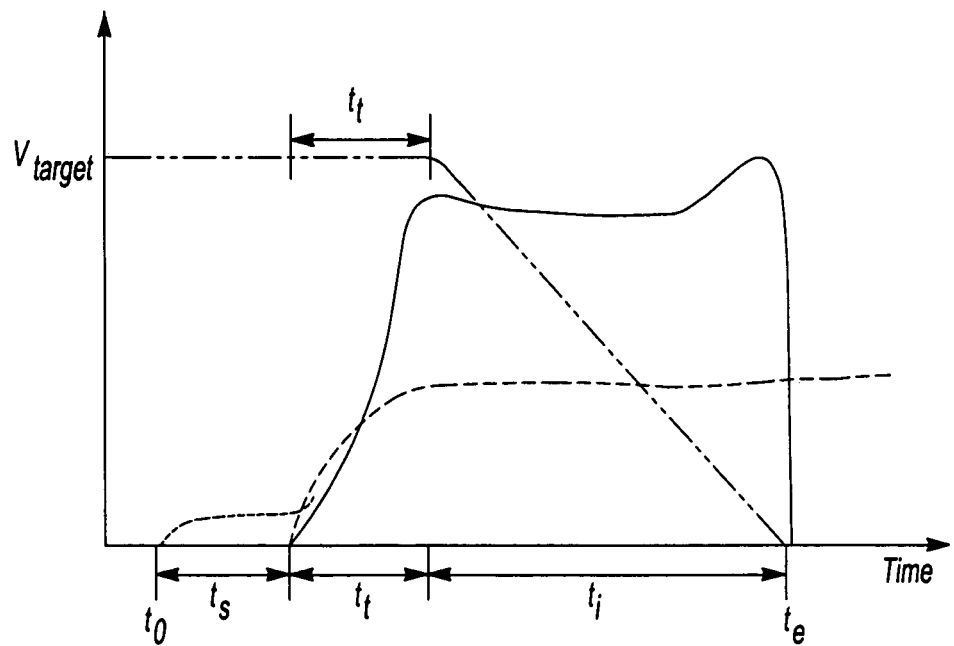
FIG. 5 is a graph illustrating an example of test data reflecting test results achieved using the method of the flow diagram of FIG. 4.

Referring now to FIG. 5, a graph is shown similar to FIG. 3 illustrating an example of test data measured according to the method of FIG. 4. Prior to beginning the engagement test, the drive motor 16 spins one part of the friction component 10a to achieve a target sliding speed $V_{target}$ while the actuator 19 strokes against its return mechanism. When engagement is commanded at to, the actuator 19 applies engagement force either pneumatically or hydraulically. The motor 16 maintains the sliding speed at or near $V_{target}$ until a time $t=t_0+t_s+t_r$, where both the actuator stroke time $t_s$ and the target torque phase interval $t_r$ are adjustable parameters. The actuator force profile may be adjusted to achieve a desired $t_s$ for a selected actuator return mechanism. The value of $t_r$ is determined a priori based upon the target torque phase time $t_r$ of a desired automatic transmission system. The control automatically turns off or decouples the driving motor 16 from the drive shaft 12 at the time $t=t_0+t_s+t_r$ to terminate the torque phase interval $t_r$. Once the drive motor 16 is decoupled, the sliding speed V(t) starts to decrease and the engagement test ends when the sliding speed V(t) reaches zero at a time $t_e$. The inertia phase interval $t_i$ varies as a function of engagement profiles similar to an actual automatic transmission. The drive motor may be controlled in such a way as to increase the sliding speed slightly during $t_r$ which more closely matches the kinematics of the automatic transmission to be modeled under certain shift conditions.

Figure 6:
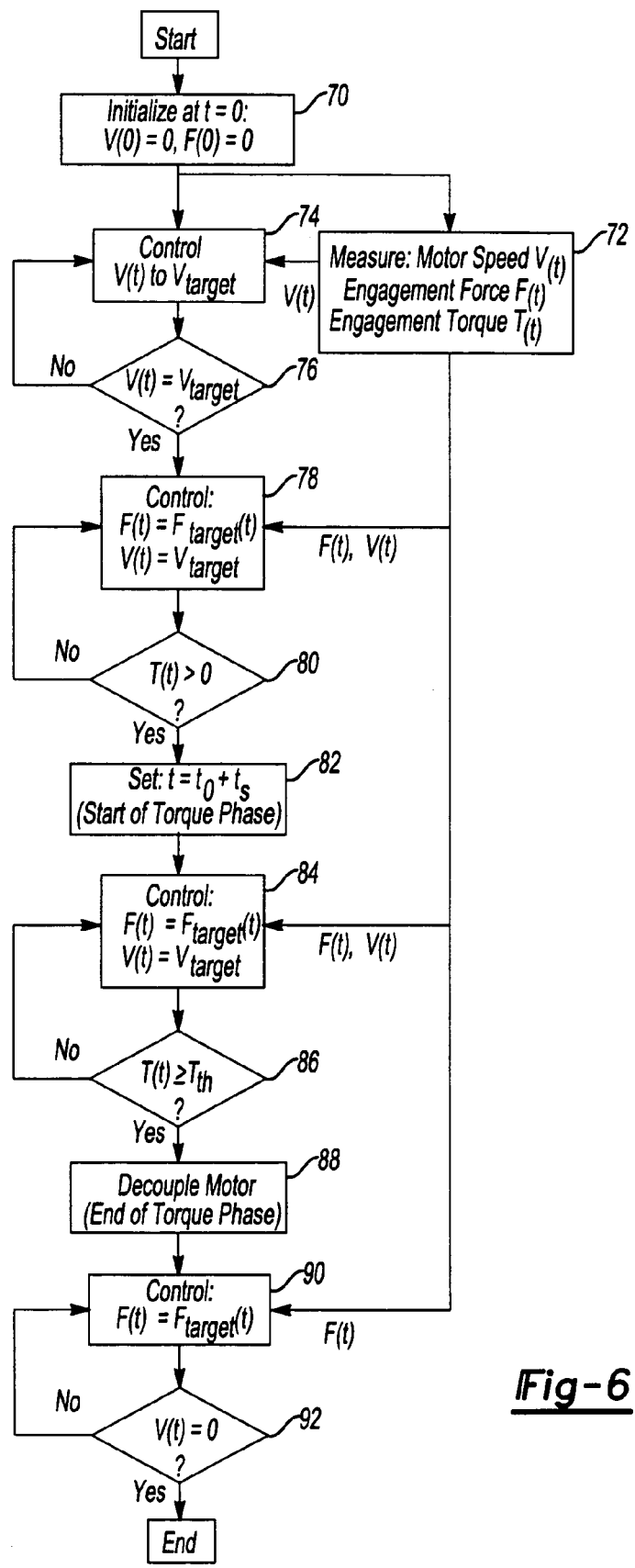
FIG. 6 is a flow diagram illustrating a control procedure wherein the motor is decoupled when $T(t)=T_{th}$.

Referring to FIG. 6, a flow diagram of an alternative control procedure for a SAE#2 friction component engagement test stand is illustrated. At a block 70, the test control system initializes control variables V(t) and F(t) at t=0 such that V(0)=0 and F(0)=0. In this embodiment, three measurements, drive shaft speed V(t), net engagement force F(t), and engagement torque T(t) are used to carry out the control procedure as shown at a block 72. Although not shown in the diagram, other variables are also measured during the test. To prepare for friction component engagement, the drive motor 16 first raises the drive shaft speed V(t) to a prescribed value $V_{target}$ as shown in an action block 74 and a decision block 76 through either an open-loop control or a closed-loop control using measurements of V(t) as a feedback signal. After V(t) reaches its target value of $V_{target}$ as shown in the block 76, the control system controls F(t) to follow the prescribed force profile $F_{target}(t)$ through either an open-loop control or a closed-loop control using F(t) as a feedback signal at a block 78. When the measured engagement torque T(t) becomes more than zero as shown in a block 80, a timer is set to $t=t_0+t_s$ to record the start of the torque phase at a block 82. As the engagement force F(t) increases following the target force profile $F_{target}$, the friction component engagement torque T(t) exerted on the drive shaft as brake torque also increases. The control system controls motoring torque to maintain the drive shaft speed V(t) (e.g. friction component slip speed) at its target $V_{target}$ through a closed-loop control using measurements of V(t) as a feedback signal as shown in an action block 84. When the measured engagement torque T(t) reaches its threshold value $T_{th}$ at a decision block 86, the motor 16 is de-powered or decoupled from the drive shaft 12 and the friction component 10 to end the torque phase $t_r$ as shown in a block 88. As the engagement continues, the drive shaft 12 slows down according to engagement torque and the mechanical inertia of the system. The control system continues to control the engagement force F(t) at a block 90 using F(t) as a feedback signal. When the drive shaft speed V(t) reaches zero, the test cycle completes at a block 92.

Figure 7:
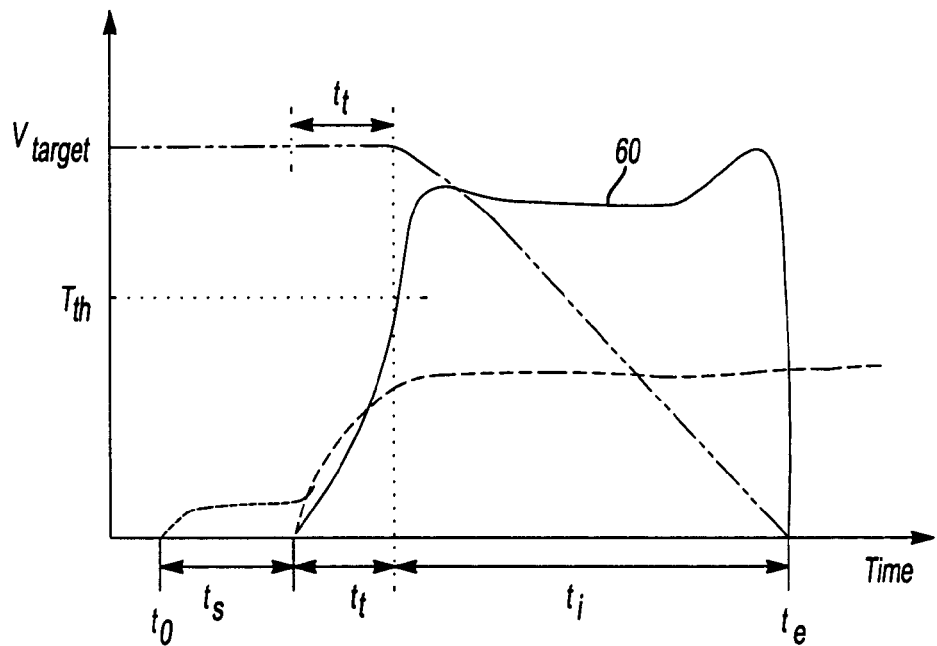
FIG. 7 is a graph illustrating an example of test data reflecting test results achieved using the method of the flow diagram of FIG. 6.

Referring now to FIG. 7, a graph is shown similar to FIG. 5 illustrating an example of test data measured according to the method of FIG. 6. The measured value of the engagement torque T(t) shown by a line 60 is directly fed back to a motor controller. When the value of the engagement torque T(t) reaches a target level of $T_{th}$, the control automatically turns off or decouples driving motor 16 from the drive shaft 12 to terminate the torque phase interval $t_r$. The torque phase interval $t_r$ varies as a function of engagement profiles under different engagement conditions similar to an actual automatic transmission.

Figure 8:
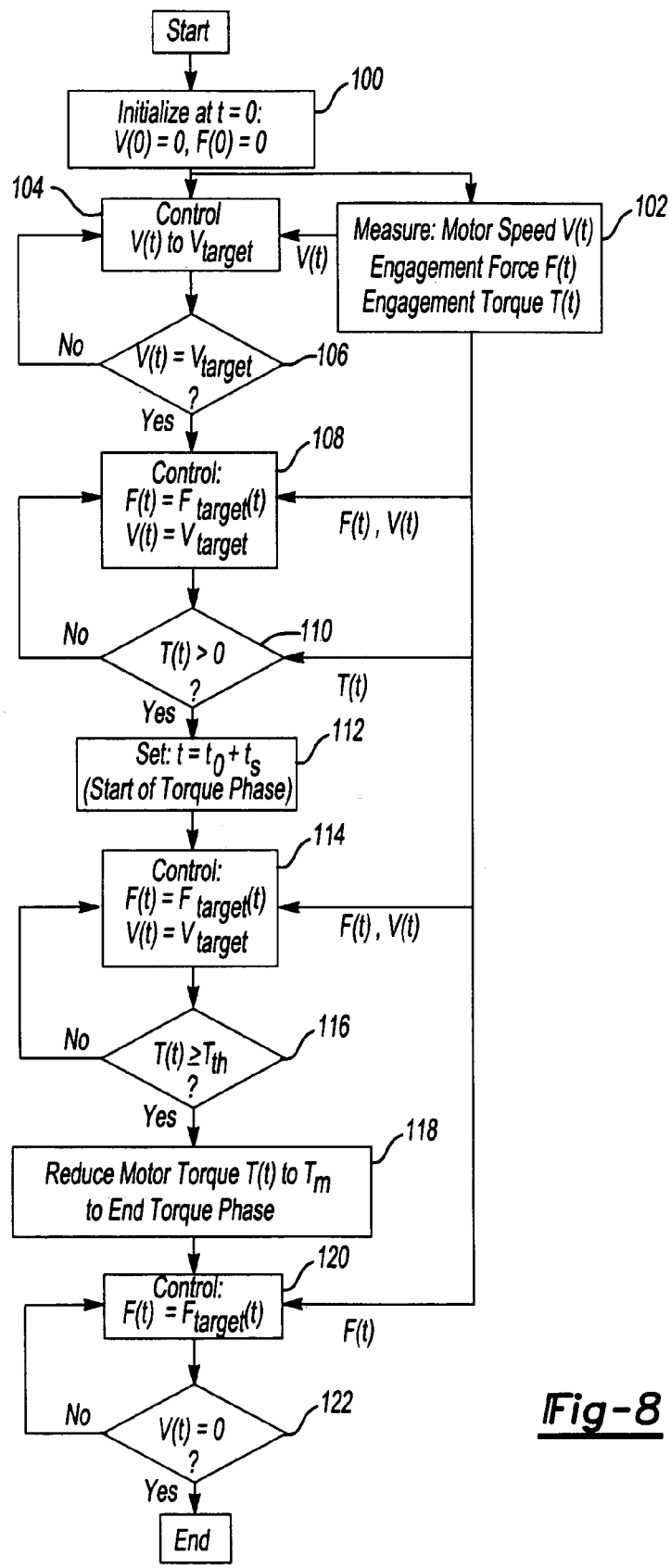
FIG. 8 is a flow diagram illustrating a control procedure wherein the motor torque is reduced to $T_m$ when $T(t)=T_{th}$.

Referring to FIG. 8, a flow diagram of another alternative control procedure for a SAE#2 friction component engagement test stand is illustrated. At a block 100, the test control system initializes control variables V(t) and F(t) at t=0, such that V(0)=0 and F(0)=0. In this embodiment, three measurements, drive shaft speed V(t), net engagement force F(t), and engagement torque T(t) are used to carry out the control procedure as shown at a block 102. Although not shown in the diagram, other variables are also measured during the test. To prepare for friction component engagement, the drive motor 16 first raises the drive shaft speed V(t) to a prescribed value $V_{target}$ as shown in a block 104 and a block 106 through either an open-loop control or a closed-loop control using measurements of V(t) as a feedback signal. After V(t) reaches it target value of $V_{target}$ as shown in the block 106, the control system controls F(t) to follow the prescribed force profile $F_{target}(t)$ through either an open-loop control or a closed-loop control using F(t) as a feedback signal at a block 108. When the measured engagement torque T(t) becomes more than zero as shown in a decision block 110, a timer is set to $t=t_0+t_s$ to record the start of the torque phase interval $t_r$ at a block 112. As the engagement force F(t) increases, the friction component engagement torque T(t), exerted onto the drive shaft as brake torque, also increases. The control system controls motoring torque to maintain the drive shaft speed V(t) (e.g. friction component slip speed) at the target $V_{target}$ through a closed-loop control using V(t) as a feedback signal at a block 114. When the measured engagement torque T(t) reaches the threshold value $T_{th}$ at a decision block 116, the motoring torque is reduced to a prescribed level $T_m$ to end the torque phase $t_r$ at a block 118. When the motoring torque drops, the drive shaft 12 starts slowing down according to engagement torque, the mechanical inertia of the system, and the predetermined level of motoring torque $T_m$. The level of $T_m$ may be adjusted to lengthen or shorten the remaining friction component engagement time or inertial phase interval $t_i$. The control system continues to control engagement force F(t) at a block 120 using F(t) as a feedback signal. When the drive shaft speed V(t) reaches zero, the test cycle completes at a block 122.

Figure 9:
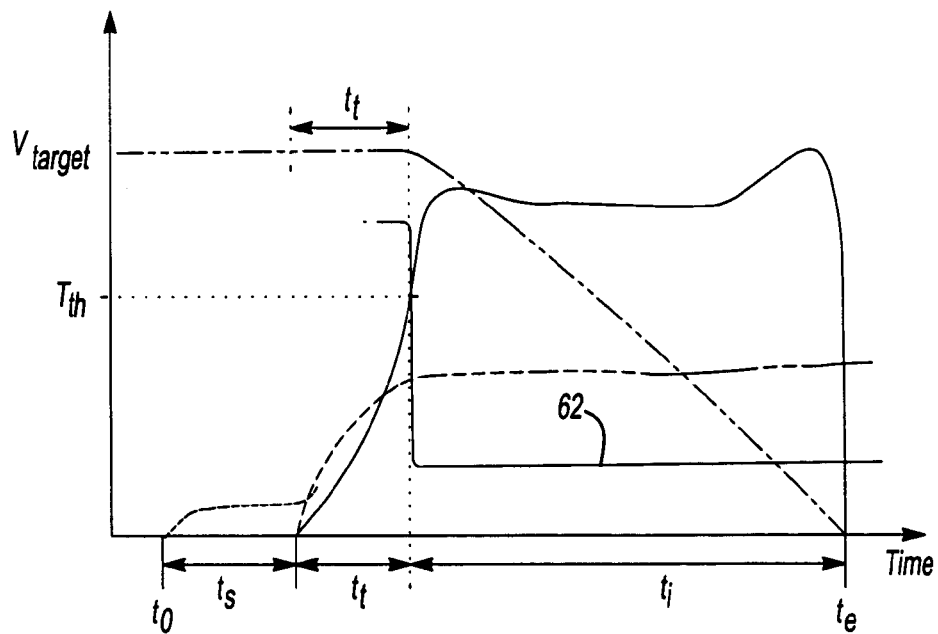
FIG. 9 is a graph illustrating an example of test data reflecting test results achieved using the method of the flow diagram of FIG. 8.

Referring to FIG. 9, a graph is shown similar to that of FIG. 7 illustrating an example of test data measured according to the method of FIG. 8. An additional line 62 has been added to illustrate the motoring torque $T_m$ that is applied in the method of FIG. 8.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method of testing a friction component for an automatic transmission, comprising:
   installing the friction component in a test stand having a drive shaft and a grounding anchor with a first part of the friction component attached to the drive shaft and a second part of the friction component attached to the grounding anchor;
   rotating the drive shaft of the test stand with a motor drive until the drive shaft and the first part of the friction component rotate at a target sliding speed $V_{target}$ and continuing rotation at $V_{target}$;
   applying an actuation force to an actuator of the friction component at a start time ($t_0$) to stroke the actuator over a stroke time ($t_s$) and to apply an engagement force to the friction component at a time $t_0+t_s$;
   continuing operation of the motor drive to maintain the speed of rotation of the drive shaft at $V_{target}$ for a period of time corresponding to a target torque phase time ($t_r$);
   decoupling the motor drive from the drive shaft at a time $t_0+t_s+t_r$ and allowing the rotating speed of the drive shaft and the sliding speed of the friction component to decrease in response to engagement of the friction component; and
   terminating the test when the sliding speed falls to zero during a time period referred to as an inertia phase ($t_i$).

2. The method of claim 1, wherein the actuator further comprises a return mechanism that applies a biasing force to return the friction component to a disengaged condition.

3. The method of claim 2, wherein $t_s$ is set to approximately zero in the absence of any significant biasing force.

4. The method of claim 1 wherein the actuator further comprises a return mechanism that applies a biasing force to return the friction component to a disengaged condition, wherein the torque phase interval ($t_r$) begins at the time $t_0+t_s$ after the actuator is stroked against the return mechanism and terminates when a feedback signal representative of a predetermined engagement torque ($T_{th}$) is obtained.

5. The method of claim 4 wherein measurements of the drive shaft rotational speed are used to control the drive shaft rotating speed at $V_{target}$ through a feedback control until the time $t_0+t_s+t_r$.

6. The method of claim 5 wherein measurements of an engagement torque T(t) are used as a feedback signal to monitor when T(t) is greater than zero to determine the time $t_0+t_s$.

7. The method of claim 4 wherein measurements of a speed V(t) of the drive shaft are used to control the drive shaft rotating speed V(t) through a feedback control until an engagement torque T(t) reaches the engagement torque $T_{th}$.

8. The method of claim 7 wherein measurements of the engagement torque T(t) are used as a feedback signal to monitor whether the engagement torque level has reached $T_{th}$.

9. A method of testing a friction component for an automatic transmission, comprising:
   installing the friction component having first and second parts in a test stand having a drive shaft and a grounding element with the first part of the friction component attached to the drive shaft and the second part of the friction component attached to the grounding element;
   rotating the first part of the friction component with a motor drive until the drive shaft and first part of the friction component rotate at a target sliding speed ($V_{target}$) and continuing rotation at $V_{target}$;
   applying an actuation force to an actuator of the friction component at a time ($t_0$);
   continuing operation of the motor drive to maintain the speed of rotation of the drive shaft at $V_{target}$ for a period of time until a predetermined level of torque ($T_{th}$) is obtained, wherein upon obtaining $T_{th}$ the motor torque is reduced to a predetermined level ($T_m$), upon reduction to $T_m$ the sliding speed of the drive shaft decreases, and terminating the test when the sliding speed falls to zero during a time period referred to as an inertia phase ($t_i$).

10. The method of claim 9 wherein the level of $T_m$ can be adjusted to lengthen or shorten $t_i$ without modifying a mechanical inertia wheel that is attached to the drive shaft.

11. A system for testing a friction component for an automatic transmission, comprising:
   a test stand having a drive shaft and a grounding portion;
   a friction component installed in the test stand, the friction component having a first part attached to the drive shaft and a second part attached to the grounding portion;
   a motor drive rotating the drive shaft of the test stand until the first part of the friction component and the drive shaft rotate at a target sliding speed ($V_{target}$) and continuing rotation at $V_{target}$;
   an actuator of the friction component being actuated at a time ($t_0$) and the actuator having a return mechanism that applies a biasing force to return the friction component to a disengaged condition, causing the friction component to be stroked against the return mechanism during a time ($t_s$) to apply an engagement force at a time $t_0+t_s$; and
   wherein operation of the motor drive is continued to maintain the speed of rotation of the drive shaft at $V_{target}$ for a period of time corresponding to a target torque phase time ($t_r$), and decoupling the motor drive from the drive shaft at the end of $t_r$ allowing the rotating speed of the drive shaft and first part of the friction component to decrease in response to engagement of the friction component, and terminating the test when the sliding speed falls to zero during a time period referred to as an inertia phase ($t_i$).

12. The system of claim 11, wherein a time for decoupling the motor drive is $t_0+t_s+t_t$.

13. The system of claim 11 wherein the target torque phase interval ($t_t$) begins at the time $t_0+t_s$ and terminates when a feedback signal representative of a predetermined level of engagement torque ($T_{th}$) is obtained.

14. The system of claim 13 wherein measurements of an engagement torque T(t) are used as a feedback signal to monitor whether the engagement torque level has reached the predetermined level of engagement torque ($T_{th}$).

* * * * *